United States Patent [19]
Harlev et al.

[11] Patent Number: 5,618,469
[45] Date of Patent: Apr. 8, 1997

[54] POLYANILINE-CONTAINING SOLUTION, ARTICLES COATED THEREWITH, AND METHODS FOR THE PREPARATION OF SAME

[75] Inventors: Eli Harlev, Arad; Tamilla Gulakhmedova, Tel Aviv; Ilya M. Rubinovich, Rechovot, all of Israel

[73] Assignee: Al-Coat Ltd., Ness Ziona, Israel

[21] Appl. No.: 440,125

[22] Filed: May 12, 1995

[30] Foreign Application Priority Data

May 23, 1994 [IL] Israel .......................................... 109741
Jul. 14, 1994 [IL] Israel .......................................... 110318

[51] Int. Cl.$^6$ .............................. H01B 1/00; H01B 1/12; H01B 1/20
[52] U.S. Cl. ......................... 252/500; 528/422; 528/210; 528/212
[58] Field of Search .......................... 252/500; 528/210, 528/212, 214, 217, 422, 423, 424

[56] References Cited

U.S. PATENT DOCUMENTS 5,232,631  8/1993  Cao et al. .............................. 252/500
5,281,363  1/1994  Shacklette et al. ...................... 252/500
5,378,404  1/1995  Han et al. ................................ 252/500

FOREIGN PATENT DOCUMENTS 104015256  1/1992  Japan .
06045195  2/1994  Japan .

*Primary Examiner*—Douglas J. McGinty
*Assistant Examiner*—M. Kopec
*Attorney, Agent, or Firm*—Oblon, Spivak, McClelland, Maier & Neustadt, P.C.

[57] ABSTRACT

The invention provides a solution comprising a proton-doped polyaniline in combination with a protonic acid which is a solvent thereof, and an article coated with an optically-transparent, electrically-conductive layer, formed from the solution, and comprising a proton-doped poiyaniline. The invention also provides a method for preparing a processable solution of a proton-doped polyaniline for use in the preparation of electrically-conductive and optically-transparent coatings, comprising oxidatively polymerizing aniline in the presence of a second protonic acid to yield a solid polyaniline; and dissolving the solid polyaniline in the first protonic acid.

9 Claims, No Drawings

POLYANILINE-CONTAINING SOLUTION, ARTICLES COATED THEREWITH, AND METHODS FOR THE PREPARATION OF SAME

The present invention relates to a polyaniline-containing solution, to articles coated therewith, and to methods for the preparation of same.

More particularly, the present invention relates to a method for preparing a processable solution of emeraldine salt (otherwise known as polyamiline) for use in the preparation of electrically-conductive and optically-transparent coatings, and to articles such as liquid crystal devices and other electro-optic devices comprising transparent electrodes which are made of same.

In the area of conducting polymers, insolubility (and hence, improcessability) is an ultimate barrier to their technological utilization. Insolubility in this class of materials has been attributed to the conjugated nature of the polymeric chains, as well as to strong inter-chain interactions.

Polyaniline (PANI), a technologically-oriented conducting polymer, is usually synthesized by chemical or electrochemical oxidative polymerization in the presence of protonic acids of small molecular size, such as HCl and $H_2SO_4$. It was found that the use of protonic acids of larger molecular size, such as toluene-p-sulphonic acid, sulphanilic acid, or polymeric electrolyte-polystyrene sulphonic acid, resulted in the production of PANIs that were soluble in common (though polar) organic solvents such as DMF and DMSO [S. Li, et al., *Synth. Met.*, Vol. 20, p. 141 (1987)]. Another group produced highly-conductive PANI coatings and films by extending this approach to more efficient functionalized protonic acid-solvent systems, such as camphorsulfonic acid m-cresol or dodecylbenzenesulfonic acid xylene [Y. Cao, et al., *Synth. Met.*, Vol. 48, p. 91 (1992)]. Solubilization in such systems has been considered to stem from the surfactant effect of bulky counter-anions, and the high conduction levels were explained as due to improved intra- and inter-chain conformations of the polymer network - favorable for an enhanced charge de-localization [A. G. MacDiarmid, et al., *Bull. Am. Phys. Soci.*, Vol. 38, p. 331 (1993)].

In current liquid crystal devices (LCDs), most of the building materials as well as fabrication processes are common to all types of such devices. Transparent electrodes, for example, are made mostly of on-glass coated indium-tin-oxide (ITO) layers that have some serious limitations.

Transparent electrodes in electro-optic devices are usually made of glass-coated ITO. The latter has several crucial shortcomings. Its application requires a relatively cumbersome and costly technology, such as vacuum deposition. Also, large area, uniform coatings cannot easily be achieved, and the product is brittle and cannot be applied as a free-standing film.

On the other hand, the combination of electrical conductivity and optical transparency makes conductive polymers natural candidates for applications in the electro-optic industry, as discussed, e.g., by Y. Cao, et al. in "Conjugated Polymeric Materials: Opportunities in Electronics, Optoelectronics and Molecular Electronics," *NATO Advanced Study Institute, Series E: Applied Sciences*, J. L. Bredas and R. R. Chance, Eds., Vol. 82, Kluwer Academic, Holland (1990).

Conductive polymers are advantageous over ITO, being mechanically robust, flexible, and easily patternable. They can be applied by a relatively low-cost technology, such as spin-coating, which is usually carried out at room temperature, can yield uniform and coherent large area coatings, and are also amenable to large-scale production.

To be also suitable for technological applications, conductive polymers must turn processable, i.e., soluble, in common solvents. To date, polyaniline (PANI) is considered the most technologically oriented conductive polymer. On the other hand, in this polymer, as in other conjugated polymers, insolubility (and hence, inprocessability) makes an ultimate barrier to its technological utilization. This property is attributed to the conjugated nature of the polymeric chains, as well as to strong inter-chain interactions.

PANI has already been reported to be applied as transparent anodes in flexible light-emitting diodes (LEDs) [see, e.g., G. Gustafsson, et al., *Nature*, Vol. 357, p. 477 (1992)].

The above descriptions, however, neither teach nor suggest a special advantage of using said polymer for LCDs, whose advantage will now be described; nor do they teach the use of other materials for this purpose.

As stated above, in current LCDs, the transparent electrodes are made of ITO-coated glass plates. These must further be top coated with a special polymeric alignment layer (usually a polyimide) for inducing unidirectionality in the liquid crystal phase. Apart of the aforementioned disadvantages involving the use of ITO in LCDs and in other electro-optic devices, the additional need for a special alignment coating makes cell fabrication all the more complex and also reduces the field induction ability of the conductive layer.

It is an object of the present invention to provide a simple and reproducible method for rendering processable proton-doped polyaniline (or emeraldine salt).

It is a further object of the present invention to provide a solution of emeraldine salt which can be used in the production of electrically-conductive and optically-transparent coatings having very highly smoothed surfaces and stability.

Additionally, it is an object of the present invention to provide articles, and particularly electronic components, coated with polyaniline prepared according to the invention.

According to one aspect of the present invention, there is provided a method of preparing a processable solution of emeraldine salt for use in the preparation of an electrically-conductive and optically-transparent coating, the method comprising oxidatively polymerizing aniline in the presence of a protonic acid to yield a solid emeraldine salt, and dissolving the solid emeraldine salt in the same protonic acid, wherein said protonic acid serves both as a dopant and as a solvent for the emeraldine salt.

In a preferred embodiment of the present invention, the protonic acid is pyruvic acid.

According to another aspect of the present invention, there is provided a solution comprising emeraldine salt prepared according to the method of the invention, for use in the preparation of an electrically-conductive and optically-transparent coatings.

According to yet another aspect of the present invention, there is provided an article coated with an electrically-conductive and optically-transparent thin coating formed from a solution prepared by the method of the invention.

In this patent specification, conductive forms of poiyaniline will be referred to as "emeraldine salt." A compound is "processable" if it is capable of being completely solubilized while retaining its useful properties, and thus its technological potential.

The underlying principle of the invention lies in the use of a protonic acid that is capable of simultaneously functioning as a solvent. Surprisingly and unexpectedly, the use of pyruvic acid as the protonating agent gave unusually good results. It has been assumed that a certain degree of solubilization of the PANI-pyruvate complex salt in pyruvic acid must occur, owing principally to structure similarity between the counter-anion and the solvent. Hydrogen-bond interactions could also play a role in solubilizing the PANI-pyruvate complex. However, the total solubility of the PANI complex in pyruvate was unexpected.

Without intending to limit the invention in any way, it is thought that the excellent solubility of the emeraldine hydropyruvate complex salt in pyruvic acid originates in a structural memory effect. In addition to this effect, structural affinity and hydrogen bonding are believed to further assist solubilization.

Structural memory effects in conducting polymers have previously been reported in the literature. For example, electrochemical counter-anion exchange experiments have revealed that the conductivity of parent polypyrrole films is preserved, regardless of the nature of the counter-anion [M. Yamaura, et al., *Synth. Met.*, Vol. 48, p. 337 (1992); M. Yamaura, et al., *Synth. Met.*, Vol. 39, p. 43 (1990)]. Structural analysis of the polypyrrole has suggested that the conductivity probably reflects not only the type of counter-anion, but also the structure of the polymer-chain network. The results of the above-mentioned experiments have indicated that a memory effect might also play a role in enhancing solubilization. On the other hand, it is worth mentioning that memory effect related to the enhanced solubilization of a chemically-synthesized conductive polyaniline has not been reported in the literature. Hence, none of the above speculations can limit the invention in any way.

The coatings obtained by the processing of PANI in accordance with the invention have the following characteristics:

a) Bulk conductivity of 0.5–20 $\Omega^{-1}cm^{-1}$;

b) Transparency window between 470 nm and 680 nm. Coatings 100 nm thick have a transmittance of 97% between these two limits, and a transmittance of 75% between 380 nm and 470 nm.;

c) Adhesive to inorganic materials, e.g. glass slides, as well as to various polymer substrates;

d) Stable under ambient conditions;

e) Simple and straightforward synthesis;

f) Can be produced in any desired quantity from relatively cheap starting materials;

g) Application (spin-coating) is simple, flexible, fast, and is carried out at room temperature;

h) Coatings are obtainable that are homogeneous, uniform, clear, and are endowed with very highly-smoothed surfaces.

The smooth surface, transparent, conductive coatings produced from solutions prepared according to the method of the present invention have many technological applications. Possible uses include conducting top-coatings for electrostatic charge dissipation (ESD) and for controlling electromagnetic interference (EMI) [A. G. MacDiarmid, *Synth. Met.*, Vol. 21, p. 79 (1987)]. Apart from being defect-free, homogeneous and uniform, the conductive coatings obtained through the method of the present invention are transparent to visible light and have glossy surfaces. Due to their high surface and optical quality, these coatings can be used as optically transparent electrodes in various electrooptical devices, such as liquid crystal devices (LCDs) and light-emitting diodes (LEDs). Micro-lithography could also be benefitted. A particular problem for multilayer resist systems is charging in e-beam lithography. A build-up of electrical charge deflects the e-beam, causing pattern displacements. For the purpose of electrical discharging in such systems, conductive inter-layers were introduced, made of ITO or ammonium poly(p-styrenesulfonate) [Y. Todokoro, et al., *J. Vac. Sci. Technol. B*, Vol. 6, No. 1, p. 357 (1988)]. ITO can be applied only by an expensive vacuum deposition technology. Furthermore, it can be a potential source of contamination. The latter compound was found to exhibit quite low conduction levels (ca. $10^{-4}\Omega^{-1}cm^{-1}$) at the limit of discharging effectiveness [M. Angelopoulos, et al., *J. Vac. Sci. Technol. B*, Vol. 7, No. 6, p. 1519 (1989)]. On the other hand, PANI coatings, endowed with conductivities as high as 5 $\Omega^{-1}cm^{-1}$, gave good results in obtaining zero pattern displacements [M. Angelopoulos, et al., ibid. (1989); M. Angelopoulos, et al., *Polym. Eng. Sci.*, Vol. 32, p. 1535 (1992)].

Unfortunately, the conventional preparation method of coated PANI (casting N-methylpyrrolidinone solutions of emeraldine base, followed by in-situ protonation with HCl solution) is cumbersome and is known to yield non-shiny and semi-transparent coatings, indicating surface roughness [M. Angelopoulos, et al., *Synth. Met.*, Vol. 21, p. 21 (1987); M. Angelopoulos, et al., *Mol. Cryst. Liq. Cryst.*, Vol. 160, p. 151 (1988).

In contrast to the aforementioned methods, the invention described herein provides coatings of high surface and optical quality, resulting from spin-coating of emeraldine salt solutions of pyruvic acid. The coatings of the present invention are therefore especially suited for applications where conductive coatings or transparent electrodes of uniform, smooth, defect-free surfaces and high optical clarity are required.

In addition to glass substrates, the conductive polymer of the present invention was found to adhere to polymer substrates, such as poly(methyl methacrylate), poly(ethyleneterephthalate), cellulose triacetate, cellulose acetate, poly(tetrafluoroethylene-co-perfluoro-[2-fluoro sulfonylethoxy]-propylvinyl ether), Nafion®, poly(vinyl alcohol) and poly(vinyl acetate).

It has been found that the conductive-transparent coatings of the present invention exhibit especially strong adherence to the surfaces of certain substrate polymers, for example, poly(methyl methacrylate), poly(vinyl acetate), and Nafion®. In the first two cases, the strong adhesion is attributed to the co-dissolution of the conductive polymer and of the corresponding substrate polymers in the same solvent (pyruvic acid) and the formation of polyblend interfaces which act as binders. In the third example, the strong adhesiveness is probably due to strong chemical interactions between Nafion®'s functional groups and the conductive polymer complex salt.

It has additionally been found that in the above three examples, the conductive polymer layers cannot be removed from the substrate polymer surfaces, neither through mechanical rubbing nor through washing the coated surfaces with water. The coated surfaces have even exhibited hydrophobic properties, for example, when the coated substrates have been put in contact with water. These findings have been completely unexpected owing to the known instability of emeraldine salt in water and the ease with which water can remove it from glass surfaces.

The capability of the conductive polymer of the present invention to adhere strongly to certain polymer substrates meets technological requirements such as those wherein conductive or conductive and transparent coatings are required which are also abrasion resistive and/or water resistive, for example, for electrical anti-charging top coatings, which are exposed to harsh outdoor conditions.

The conductive-transparent polymer of the present invention can be blended with some host polymers to give polyblends of different polymer ratios. Host polymers are those which co-dissolve in pyruvic acid along with the conductive transparent polymer of the present invention. The following are examples of host polymers capable of forming polyblends with the conductive polymer of the present invention: poly(methyl methacrylate); cellulose tri-acetate; cellulose acetate; poly(vinyl alcohol); poly(vinyl acetate); nylon 6,6.

The ability to form polyblends composed of a conductive component (guest) and of a non-conductive component (host) is of technological importance, since it allows the fabrication of conductive layers/matrices endowed with the combined mechanical and physical properties of both the host component and the conductive (guest) component. Also, because polyblends of various conductive polymer/host polymer ratios can be made, it is possible to precisely tailor the product's physical and mechanical properties to fulfill specific technological requirements.

The following is a list of additional potential technological-applications for coatings obtained according to the method of the present invention:

a) Conductive coatings for electrolytic and electroless metallization processes [M. Angelopoulos, ibid., (1992)];

b) Charge eliminating layers for SEM and x-ray analyses [M. Angelopoulos, ibid., (1992)];

c) Active anti-corrosion coatings [F. C. Jain, et al., *Corrosion*, Vol. 42, p. 700 (1986); K. G. Thompson, et al., "Corrosion-Protective Coatings from Electrically Conducting Polymers,"*Technology* 2001, San Jose, Calif., U.S.A. (1991); B. Wessling, *Adv. Mater.*, Vol 6, No. 3, p. 226 (1994)];

d) Materials for non-linear optical devices;

e) IR and microwave absorbing shields;

f) Rechargeable batteries [A. G. MacDiarmid, et al., *Synth. Met.*, Vol. 18, p. 393 (1984)].

Thus, according to the present invention, there is now provided a solution comprising a proton-doped polyaniline in combination with a protonic acid, which is a solvent thereof.

The invention especially provides said solution whenever used in the preparation of an electrically-conductive and optically-transparent coating.

In preferred embodiments of the present invention, said solution further comprises a non-conductive polymer selected from the group consisting of poly(methyl methacrylate), cellulose tri-acetate, cellulose acetate, poly(vinyl alcohol), poly(vinyl acetate) and nylon 6,6.

In another preferred aspect of the present invention, there is provided an article coated with an optically-transparent, electrically-conductive layer, formed from a solution comprising a proton-doped polyaniline in combination with a protonic acid, which is a solvent thereof.

In preferred embodiments of the present invention, said layer has an electrical conductivity of from about 0.1 $\Omega^{-1}$/cm to 20 $\Omega^{-1}$/cm.

In especially preferred embodiments of the present invention, said article comprises a substrate coated with said layer, which article is water stable and hydrophobic, and wherein said substrate comprises a polymer selected from the group consisting of poly(methyl methacrylate), poly(ethylene-terephthalate), cellulose tri-acetate, cellulose acetate, poly-(tetrafluoroethylene-co-perfluoro [2-fluorosulfonylethoxy]-propylvinyl ether), Nafion®, poly(vinyl alcohol), poly(vinyl acetate), and nylon 6,6.

In the most preferred embodiments of the present invention, said articles are characterized by a polyblended interface formed between said layer and said substrate, which functions as a binding layer.

Preferably, said substrate comprises poly(methyl methacrylate).

The aforementioned, newly-devised processing procedure for PANI, made possible the fabrication of on-glass coatings that, following buffing of the polymer surface, turned out to effectively induce unidirectionality in various nematic liquid crystals. Hence, the newly-devised polymeric coatings appear to play a bi-functional role in LCDs, i.e., as conductive transparent electrodes that simultaneously also impart alignment to the liquid crystal phase. Thus, the advantage of using PANI-coated transparent substrates as transparent electrodes in LCDs is twofold: (a) special aligning and smoothing layers are unnecessary, and (b) a fast, low-cost and flexible process for transparent electrode fabrication is provided.

The present invention also suggests that, owing to the non-presence of special alignment (insulating) layers in LCDS based on conductive polymer electrodes, the latter, through making a direct contact with the liquid crystal phase, may induce the same field effect in the latter as does ITO, even if being endowed with higher surface resistivity.

The present invention deals with the application of a conductive polymer in liquid crystal cells containing various types of electro-optic active materials (the liquid crystal phase) which may be either nematic, cholesteric, ferroelectric, twisted nematic, or super twisted nematic.

A central aspect of the present invention is the application of a solution processed polyaniline in its conductive (proton doped) state, that is prepared according to the presently-claimed process or according to any other procedure that can yield a solution processable proton doped conductive polyaniline, to be used simultaneously as transparent electrodes and as alignment and smoothing layers in various LCDs. There is thus no need for a special layer that induces alignment in the liquid crystal phase.

Thus, the present invention provides an orientation-inducing transparent electrode in a liquid crystal device (LCD), comprising a solution processable, electrically conductive, optically transparent layer of a proton-doped polyaniline.

As stated above, it has now been found that the buffed conductive polymers according to the present invention, in their unsubstituted or substituted states, as an on-glass layer or a layer coated on non-conductive various polymer substrates, simultaneously fulfill the roles of transparent electrodes, aligning inducing layers, and surface smoothing layers. The buffed conductive polymer coating can also be applied merely as an aligning inducing and surface smoothing layer which is top coated on a conductive layer made of a different electrically conductive and optically transparent material, such as ITO.

The conductive layer is preferably applied through a spin-coating procedure, although other modes of application could be considered, such as dip-coating, doctor-blade coating, or spraying.

The transparent electrodes of the present invention, which are based on a conductive polymer, are applicable, in principle, in LCDs with different cell geometries or different structures, such as single-picture element displays or multi-picture element displays.

The present invention also suggests that, owing to the non-presence of a special alignment layer, usually made of an insulative material [polyimide poly (vinyl alcohol)], in LCDs based on conductive polymer electrodes, electrodes endowed with higher surface resistivities than those exhibited by ITO can induce the same field effect in the liquid crystal phase as does the latter. Thus, only moderate conduction levels of the coatings, which are achievable in conductive polymers, will suffice for a proper functioning of LCDs based on conductive polymer electrodes.

Another advantage of using a conductive polymer as an orientation inducing transparent electrode in LCDs is that it reduces, or even eliminates, electrostatic problems due to the rubbing process or due to ion contamination. An improvement of orientation uniformity of the liquid crystal phase is thus expected, yielding better functioning of the cells (higher contrast, for example).

Another aspect of the present invention relates to combining the physical and mechanical properties of indium-tin-oxide (ITO) and those of the conductive-transparent polymer of the present invention. For example, an ITO layer endowed with low surface resistivity, which is top-coated with the conductive polymer layer of the present invention, would afford a desirable combination of a transparent electrode having a low surface electrical resistivity, high surface smoothness, and also, following buffing of the conductive polymer top layer, the ability to induce alignment to the liquid crystal phase in liquid crystal devices. Such a layer combination of ITO and the conductive-transparent polymer of the present invention has two additional aspects:

1) Unlike insulating alignment layers (PVA, polyimides), the alignment-inducing conductive polymer layer, which is in direct contact with the liquid crystal phase, will also prevent surface electrical charging which may occur due to the buffing procedure, or due to ion contamination. This would result in an improved alignment uniformity of the liquid crystal phase.

2) A conductive polymer layer coating on the ITO layer would improve the latter's electrical conduction uniformity, through bridging structural defects.

Thus, according to the present invention, there is now also provided an electrode for ferroelectric LC cells or for twisted nematic LC cells or for super twisted nematic LC cells, comprising ITO coated glass plates which are top coated with an alignment-inducing layer, which is simultaneously also a surface-smoothing layer made of a proton-doped polyaniline.

In a variation of the above, the present invention also provides an article comprising a substrate coated with a layer according to the present invention and then top-coated with ITO, for the purpose of electrically bridging any microscopic electrical discontinuations which develop in the ITO layer.

The present invention will be better understood from the following detailed description of preferred embodiments.

In their most general aspect, solutions for the preparation of electrically conductive coatings according to the invention comprise two ingredients:

a) an unsubstituted or variously substituted polyaniline, or various co-polymer combinations, or various polyblend combinations; and
b) a protonic acid.

The unsubstituted polyaniline is derived from unsubstituted aniline and the substituted polyaniline is derived from substituted aniline. Said substituents are preferably selected from the group consisting of alkyl and alkoxy groups.

In a most preferred embodiment of the present invention, the polyaniline is derived from unsubstituted aniline.

In a further most preferred embodiment, the protonic acid is pyruvic acid.

Emeraldine base (EB) was prepared by a chemical oxidative polymerization of aniline [G. E. Asturias, et al., *Synth.*
*Met.*, Vol. 29, p. E157 (1989)], except that pyruvic acid was used as the protonating agent instead of hydrochloric acid, followed by a reaction with ammonium hydroxide solution. The EB so obtained was found to react with pyruvic acid while being crushed in an agate mortar, yielding a viscous green mixture composed of solution and suspended particles. After an additional amount of pyruvic acid was introduced to form a calculated mixture of 1% EB in pyruvic acid, the mixture was sonicated for 5 hours, and a true emeraldine salt solution was obtained, which was filtered and thereafter, upon spin-coating, produced particle-free glossy coatings.

Practically particle-free solutions of the conductive polymer complex emeraldine salt in pyruvic acid were prepared by passing the pyruvic acid solutions through glass fiber filters. The best results were obtained through using Whatman glass fiber filters GFA, GFC and GFF, in series.

On the other hand, replacing the pyruvic acid with HCl in the oxidative polymerization stage resulted in an emeraldine-hydropyruvate salt, obtained by re-protonating of the EB with pyruvic acid, which could only be partially dissolved in pyruvic acid even after being sonicated for an extended period of time. The solutions so obtained still contained a large amount of suspended particles.

When the stability of electrical conduction (four-probe method) of the polymer coatings prepared from the pyruvic acid solutions was measured, it was found to rapidly decrease in time (from 2 S/cm to 0.7 S/cm in 48 hours). An enhanced decrease in conductivity was observed if coated glass slides were exposed to a strong neon light. These findings suggested a light-enhanced degradation of the complex. However, a slower, but still significant, reduction in conductivity was detected in samples placed in a darkened vacuum chamber (22% in two days), revealing an inherent instability of the emeraldinehydropyruvate complex salt. UV measurements indicated a graduate de-protonation of the system that could afford an explanation for the above observations.

On the other hand, it has been discovered that certain secondary protonic acids could be incorporated into the emeraldinehydropyruvate solution system, resulting in stable emeraldine salt conductive coatings that still exhibited surface smoothness resembling that of emeraldinehydropyruvate complex coatings. For example, it was found that no reduction in the electrical conduction level occurred in a PANI/2-pyrrolidon- 5-carboxylic acid/pyruvic acid system (0.5:1 molar ratio of secondary protonic acid to aniline). Solutions of 2% EB/racemic 2-pyrrolidon-5-carboxylic acid (PCA) complex in pyruvic acid, after being spin-coated on pre-cleaned glass slides and vacuum dried for 24 hours, yielded shiny transparent coatings which; under ambient conditions, exhibited no reduction in conductivity (ca. 5 $\Omega^{-1}$/cm) over a period of two months. Other protonic acids, such as quinolinic acid, taurine, and others, were found to induce the same conduction stabilizing effect as does racemic PCA.

The solution from which conductive-transparent coatings can be prepared has a shelf life of at least 6 months if it is kept at 5° C.; it is apparently stable for a period of one year or more. Under such conditions, no visual changes could be indicated in the solution (such as change of color, phase separation), nor was there a change in bulk electrical conductivity of coatings made from it.

Thus, in another preferred embodiment of the invention, solutions for the preparation of stable, electrically-conductive coatings according to the invention further comprise one or more secondary protonic acids.

The secondary protonic acids include those which are soluble in pyruvic acid and have dissociation constants in aqueous solutions greater than 0.001. Most preferred are those which form a complex with polyaniline, the latter having a conductivity of greater than about $10^{-3}$ $\Omega^{-1}$/cm. Cyclic protonic acids that include imide groups such as the aforementioned PCA racemic mixture and its two optically active isomers (L-pyroglutamic acid and D-pyroglutamic acid) seem to be particularly effective. Other protonic acids, such as the aforementioned quinolinic acid and taurine, can also be used.

Preferably, said second protonic acid is selected from the group comprising racemic 2-pyrrolidon-5-carboxylic acid, quinolinic acid, maleic acid, itaconic acid, citraconic acid, ketoglutaric acid, taurine, β-hydroxy-4-morpholinepropane sulfonic- acid (MOPSO), 4-morpholinepropane sulfonic acid (MOPS), S-(–)-2-pyrolidone-5-carboxylic acid, or its enantiomer.

As stated above, the present invention provides a method for preparing a processable solution of a proton-doped polyaniline for use in the preparation of an electrically-conductive and optically-transparent coating, comprising oxidatively polymerizing aniline in the presence of a first protonic acid to yield a solid polyaniline; and dissolving said solid polyaniline in said first protonic acid.

From the above, it will be realized that the present invention also provides a preferred method wherein said solid polyaniline dissolved in said first protonic acid is then combined with a base to form an emeraldine base, whereafter said base is dissolved in said first protonic acid in the presence of a second protonic acid.

While the invention will now be described in connection with certain preferred embodiments in the following examples so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

EXAMPLE 1

50 ml of chloroform and 0.93 g (0.01 mol) of freshly-distilled aniline were introduced into a 100 ml Erlenmeyer flask. A solution mixture, containing 1.82 g (0.008 mol) of ammonium peroxydisulphate, 4 ml of distilled water, and 1.76 g (0.02 mol) of freshly-distilled pyruvic acid was added drop-wise into the flask over a period of 1 hr at room temperature, while being stirred vigorously. The mixture was then vacuum-filtered and the resulting dark green solid polymer was washed with acetone, then with water, and again with acetone. Each washing step was continued until the filtrate became colorless. The solid was then dried for 1 hr at room temperature under a dynamic vacuum. The dried, dark green emeraldine salt was then allowed to react for 2 hr with 50 ml of 3% aqueous ammonia solution, and the resulting emeraldine base was filtered and washed with distilled water until the pH was between 7 and 8. Subsequently, the polymer was further washed with methanol until the washing liquid became colorless, and was finally washed with ether. The emeraldine base was then dried in a dynamic vacuum at room temperature.

The emeraldine base so obtained was crushed in an agate mortar with a small amount of pyruvic acid. The resulting green mixture was further diluted with pyruvic acid to a concentration of 1% (based on EB). The mixture was then sonicated for 6 hr before a racemic mixture of 2-pyrrolidone-5-carboxylic acid (0.5 mol ratio to EB) was added. Sonication was continued for a further 3 hr. The resulting complex solution was filtered through a PVDF 0.45 µm filter.

The above procedure resulted in an emeraldine salt solution that, upon spin-coating at 3,000 rpm on pre-cleaned glass slides, gave particle-free, 100 nm-thick, conducting transparent coatings. The coated slides were subsequently vacuum dried at 37° C. for 48 hr. The coatings were adhesive to the pre-cleaned glass surfaces, highly uniform, homogeneous, and clear. Coatings 50 nm thick gave electrical surface resistivities (4-probe method) of approximately 20,000 $\Omega$/square ($\sigma$=5 $\Omega^{-1}$cm$^{-1}$).

EXAMPLE 2

Solutions of 1% conductive polymer emeraldine salt complex in pyruvic acid and 5% of poly(methyl methacrylate) in the same solvent were separately prepared by dissolving the solutes in an ultrasonic bath for 5 hr. The two solutions were then combined and filtered to remove undissolved particles. Conductive-transparent coatings were prepared through spin-coating of the polymer solution on glass, or on polymer substrates.

EXAMPLE 3

LC cells were fabricated using electrodes made of glass plates coated with transparent conductive polyaniline prepared according to Example 1. Two geometries of cells were checked: planar and twisted nematic. The cells were filled in the isotropic state and cooled down to the nematic state. Observations through a polarized microscope revealed that the nematic phase had been aligned parallel to the buffing direction of the conductive polymer surfaces. This seemed mostly to be an effect of the ordering of the polymeric chains.

It was found that the electro-optical characteristics of the cells were the same for ITO electrodes and for the newly-devised polyaniline electrodes.

Cell Data

1. Liquid crystal: ZLi 2293 (Merck, Germany) and CB15 (Merck, England).

2. Electrodes: glass slides (1 inch) coated with 100 nm thick and 200 nm thick conductive PANI layers.

3. Gap between electrodes: 5.6 µm and 4.25 µm.

4. Cell geometry: planar and twisted nematic.

5. Rubbing procedure: 50 times unidirectionally with an artificial velvet.

6. White light source was used in the experiments, during which the cells were located between two crossed polarizers.

7. Applied voltage: 10 V, 400 Hz.

EXAMPLE 4

LC cells were fabricated, using a ferroelectric liquid crystal as the electrooptic active phase. The electrodes used were a purchased indium-tin-oxide (ITO) coated 1-inch glass slides, which were further coated with a conductive polymer, the latter being prepared as described above in Example 1. Buffing of the top polymer layer was carried out and the cell was constructed with the buffing directions of the two electrodes parallel to each other. During cell fabrication, it was necessary to heat the cell to 106° C. in order to reduce the liquid crystal viscosity. In this cell the conductive polymer is playing the roles of a transparent electrode, an alignment inducing layer to the liquid crystal phase, and a surface smoothing layer.

The so-made cells exhibited alignment of the LC phase and also electrooptical characteristics similar to those found in cells comprising conventional polyimide or poly(vinyl alcohol) made alignment layers. The aligning property of the conductive polymer is thus found to still exist in spite of heating the cell during the fabrication process.

The obtained switching times in the above-described cells are characteristic to ferroelectric LC cells (around 40 μsec). It is also expected that, through improvements in cell construction, it would be possible to still better the cell's optical characteristics, such as contrast ratio and display uniformity. This assumption is based on the fact of the much lower surface electrical resistivity (reduction in 16 orders of magnitude) of the conductive polymer compared to that of conventional alignment materials (polyimide, for example). Such a difference eliminates the possibility of electrical charging and also reduces the chances of ion contamination of the alignment layer during the buffing process. Both result in an improved uniformity in the LC phase.

Cell Data

1. Ferroelectric liquid crystal: ZLI4655100.
2. Electrodes for ferroelectric cells: ITO coated 1-inch glass slides with surface resistivity of 200 Ω/square which are top coated with 100 nm thick conductive PANI layer.
3. Gap between electrodes: 2.5 μm.
4. Cell geometry: planar.
5. Rubbing procedure: 50 times unidirectionally with an artificial velvet.
6. White light source was used in the experiments, during which the cells were located between two crossed polarizers.
7. Applied voltage: 5 V, 1 Hz.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A solution which is liquid at ambient temperature, comprising a proton-doped polyaniline in combination with pyruvic acid which is a protonating agent and which is present in sufficient excess to act as a solvent for said proton-doped polyaniline wherein said solvent consists of pyruvic acid and, optionally, one or more second protonic acids which function as a stabilizer for said proton-doped polyaniline.

2. A solution according to claim 1, wherein said solution has a stability at 5° C. of at least six months.

3. A solution according to claim 1, wherein said solution has a stability at 5° C. of at least twelve months.

4. A solution according to claim 1, further comprising a non-conductive polymer selected from the group consisting of poly(methyl methacrylate), cellulose tri-acetate, cellulose acetate, poly(vinyl alcohol), poly(vinyl acetate), and nylon 6,6.

5. A solution according to claim 1, prepared by a method comprising the steps of:

oxidatively polymerizing aniline in the presence of pyruvic acid to yield a solid polyaniline;

reacting said solid polyaniline with a base to form an emeraldine base; and dissolving said emeraldine base in pyruvic acid in the presence of a second protonic acid which functions as a stabilizer for dissolved protonated polyaniline.

6. A solution according to claim 5, in which said second protonic acid is selected from the group consisting of racemic 2-pyrrolidon-5-carboxylic acid, quinolinic acid, maleic acid, itaconic acid, citraconic acid, ketoglutaric acid, taurine, β-hydroxy-4-morpholinepropane sulfonic acid (MOPSO) and 4-morpholinepropane sulfonic acid (MOPS).

7. A solution which is liquid at 5° C., consisting of a proton-doped polyaniline and pyruvic acid as a protonating agent, wherein pyruvic acid is present in sufficient excess to act as a solvent for said proton-doped polyaniline.

8. The solution of claim 1, comprising 1% emeraldine base in said protonic acid.

9. The solution of claim 7, comprising 1% emeraldine base in said protonic acid.

* * * * *